F. ENOS, Jr.
POULTRY FEEDER.
APPLICATION FILED MAR. 20, 1909.
952,793.
Patented Mar. 22, 1910.
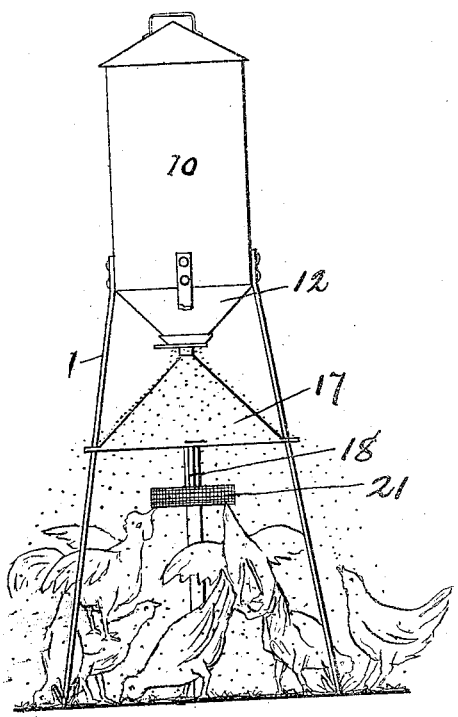
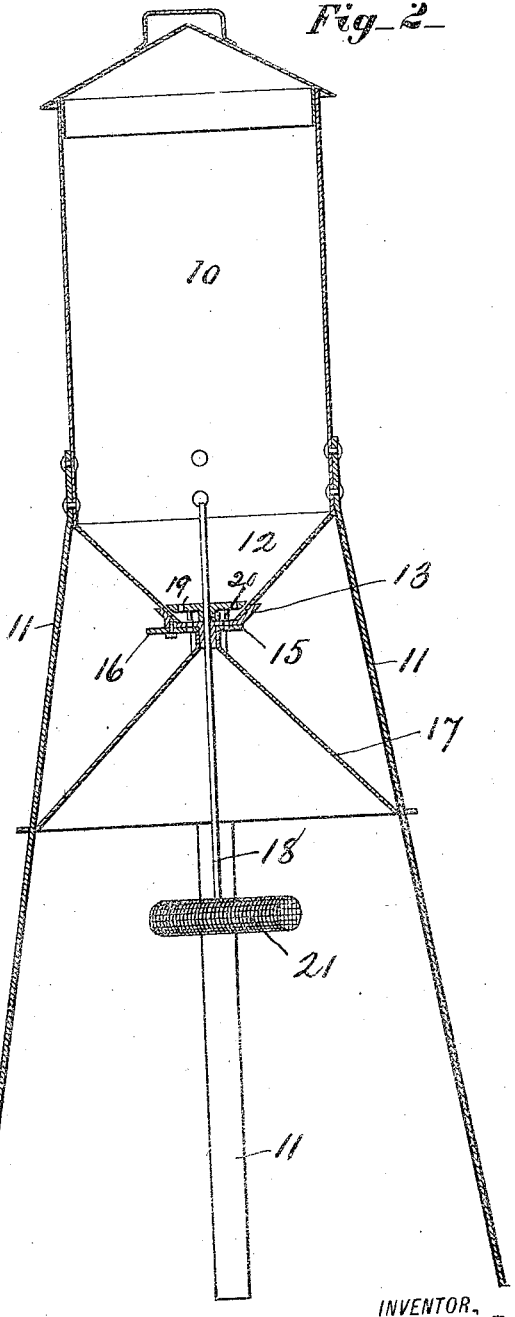
WITNESSES
Frank C. Palmer
Madeline D. Ritchie
INVENTOR,
Frank Enos Jr.,
BY
Frank H. Allen
ATTORNEY.

UNITED STATES PATENT OFFICE.

FRANK ENOS, JR., OF NORWICH, CONNECTICUT, ASSIGNOR TO NORWICH AUTOMATIC FEEDER CO., OF NORWICH, CONNECTICUT, A FIRM.

POULTRY-FEEDER.

952,793.

Specification of Letters Patent.   Patented Mar. 22, 1910.

Application filed March 20, 1909.  Serial No. 484,677.

*To all whom it may concern:*

Be it known that I, FRANK ENOS, Jr., a citizen of the United States, residing at Norwich, in the county of New London and State of Connecticut, have invented a new and useful Improvement in Poultry-Feeders, of which the following is a specification, reference being had to the accompanying drawings.

The object of this invention is to provide a simple, effective, and reasonably cheap device for feeding grains, dry mash etc., to poultry; said device being of such construction that the fowls are caused to exercise constantly and freely by reason of their efforts to obtain the feed, as I shall explain more fully hereinafter.

In order to explain my said invention clearly I have provided the accompanying sheet of drawings in which—

Figure 1 is an elevation of a feeder embodying my present improved feeder illustrating also the manner in which it is operated by the fowls. Fig. 2 is a relatively enlarged, central, vertical, sectional view of said feeder. Fig. 3 shows plan and edge views of a novel form of agitator valve which I employ at the delivery throat of the hopper in which the supply of feed is stored. Fig. 4 is an underside view of an adjustable cut-off plate by means of which the device may be made to feed coarse or fine grains.

Referring to these drawings, the reference numeral 10 indicates a cylindrical hopper, adapted to receive a supply of grain or other feed, said hopper being supported on substantial legs 11. The bottom of said hopper is formed as an inverted, truncated, cone 12 in whose otherwise open, lower, end portion is fixed a disk 13 having a plurality of openings 14, and mounted immediately below the disk 13 is a similar perforated disk 15 having a radial handle 16 by means of which the said disk 15 may be partially rotated to enlarge or reduce the coincident openings in the disks 13 and 15 and thus provide for the delivery of coarse or fine feed. Immediately below the hopper, and also supported by the legs 11, is a cone 17 upon which the feed falls as it drops from the described delivery openings and by means of which cone the feed is scattered radially, as is indicated in Fig. 1 of the drawings.

The reference numeral 18 denotes a vertical rod which extends upward through the center of the cone 12 and through the center of disks 15—13, and has secured to its upper end a perforated disk 19 which is provided, as here shown, with pins 20, on its under face, which rest upon the fixed disk 13. Secured to the lower end of the rod 18 is a transverse head 21 formed of wire screen which is filled with grains and serves as a bait to attract and engage the attention of the fowls. The meshes of the wire screen of the bait head 21, however, are so small that the grain cannot pass outwardly through said meshes, but the efforts of the fowls as they peck at said grain, operate to partially rotate the bait head and the connected rod 18 and disk 19, thus agitating the grains in the hopper 10 and causing them to rattle downward through the holes in said disk 19 (or around the edge of said disk) and finally pass downward through the perforations in disks 13 and 15 onto the cone 12, whence they fall to the ground and are picked up by the expectant fowls. So soon as the food thus dislodged has been eaten by the fowls they immediately return to the bait head 21 and again peck at said bait until another supply of grains showers down around them from the hopper and cone.

My described device is particularly desirable for the reasons that the fowls are compelled to work (exercise) for their food, and they cannot gorge themselves as they are wont to do when the grains are thrown directly upon the ground in large quantities.

Having thus described my invention I claim:—

A poultry feeder comprising a hopper having a relatively small opening at its base, a cap having circularly arranged openings for closing said opening, a cut-off slide for said circularly arranged openings, a perforated disk mounted in said cap and spaced from its bottom, a rotatable element depending from said disk and rigidly attached thereto, a bait on said element, and pins depending from said disk and arranged in concentric series with said circularly arranged openings.

FRANK ENOS, JR.

Witnesses:
FRANK H. ALLEN,
MADELINE D. RITCHIE.